United States Patent [19]
Beckmann

[11] Patent Number: 5,362,191
[45] Date of Patent: Nov. 8, 1994

[54] BOBBIN TRANSPORT DEVICE

[75] Inventor: Harald Beckmann, Gevelsberg, Germany

[73] Assignee: Maschinenfabrik Alfred Schmermund GmbH & Co., Gevelsberg, Germany

[21] Appl. No.: 995,836

[22] Filed: Dec. 23, 1992

[30] Foreign Application Priority Data

Dec. 24, 1991 [DE] Germany ............................. 4143044

[51] Int. Cl.[5] ........................ B65H 1/00; B65H 67/06
[52] U.S. Cl. .................................... 414/225; 414/730; 414/908; 414/911; 294/907; 294/93; 901/35
[58] Field of Search ............... 414/729, 730, 908, 910, 414/911, 225, 226, 684; 901/35, 33, 31, 39; 242/57; 294/907, 93-97

[56] References Cited

U.S. PATENT DOCUMENTS

| | | | |
|---|---|---|---|
| 4,558,830 | 12/1985 | Larsson | 414/911 X |
| 4,685,711 | 8/1987 | Zuber | 294/93 X |
| 4,687,244 | 8/1987 | Cullen et al. | 294/93 X |
| 4,723,884 | 2/1988 | Brinker et al. | 294/907 X |

FOREIGN PATENT DOCUMENTS

| | | |
|---|---|---|
| 0033689 | 8/1981 | European Pat. Off. . |
| 0045174 | 2/1982 | European Pat. Off. . |
| 1802212 | 10/1970 | Germany . |
| 3501692 | 7/1986 | Germany . |

Primary Examiner—Donald W. Underwood
Attorney, Agent, or Firm—Chilton, Alix & Van Kirk

[57] ABSTRACT

Apparatus for transporting packaging material supply reels from a storage location to a consumption station which includes a gripping mechanism for engaging the core tube of the supply reel and a support for the gripping mechanism, the support permitting the gripping mechanism to be moved in three mutually perpendicular directions. The support includes a pair of angularly arranged, pivotal contact arms which define an angle, the axis of the gripping means lying in a plane which bisects the angle between the contact arms. Deflection of both arms to preselected angular positions against a resilient bias will be indicative of establishment of a coaxial relationship between the gripping mechanism and the core of the supply reel whereupon the gripping mechanism may be inserted into the core for engagement therewith and subsequent reel transfer.

19 Claims, 2 Drawing Sheets

BOBBIN TRANSPORT DEVICE

BACKGROUND OF THE INVENTION

1. Field of the Invention.

The present invention relates to transport devices for bobbins which function as a source of web-like wrapping material and particularly to devices for moving reels of packaging material from storage to a consumption location such as, for example, the unwinding station of a cigarette packaging machine. More specifically, this invention is directed to the exercise of control over a gripping mechanism which is displaceable in three mutually orthoginal directions whereby the gripping mechanism may be aligned with an object to be moved, caused to engage that object and subsequently transport the object to a desired location. Accordingly, the general objects of the present invention are to provide novel and improved apparatus and methods of such character.

2. Description of the Prior Art

While not limited thereto in its utility, the present invention is particularly well suited for use in association with a cigarette package forming machine which employs, as raw material from which the packages are formed, wrapping material in the form of a continuous web. The web-type wrapping material is furnished by the manufacturer thereof on supply reels or bobbins. A plurality of such bobbins will typically be stacked on a pallet. A prior art device for transferring the filled bobbins from a pallet to a consumption station of a cigarette packaging machine may be seen from published German Patent Application DE-A 3,501,692. The apparatus of the referenced application includes a gripping mechanism having jaws which are designed for insertion in the core tube of a bobbin whereupon the bobbin may be engaged, lifted from the pallet and transferred to the consumption station. In order to automate the engagement and transfer operations, the prior art gripping mechanism is displaceable in a plane on a height-adjustable frame by means of linear drives. The frame is provided with bobbin position sensors so that the vertical position of the frame will be adjusted so as to be above a plane defined by the side surface of a bobbin to be transferred. Additional sensors are provided on the gripping mechanism to produce movement thereof in two directions relative to the frame so as to position the gripping mechanism coaxially with the tube of the bobbin to be transferred. Apparatus of the type disclosed in German application 3,501,692 is relatively complex, occupies a substantial amount of factory floor space and requires costly control apparatus.

SUMMARY OF THE INVENTION

The present invention overcomes the above-briefly discussed and other deficiencies and disadvantages of the prior art by providing a novel and improved transport device which is less complex, less costly, more reliable and occupies less floor space when compared to prior art devices of similar character. The present invention also encompasses a novel technique for establishing registration between the gripping mechanism of a bobbin transport device and a supply reel to be moved.

Apparatus in accordance with the present invention includes a holder for the gripping mechanism, the holder being provided with a pair of angularly related, pivotally mounted contact or feeler arms. The gripping mechanism is mounted such that its axis is intersected by a line which bisects the angle defined by the normal, undeflected position of the contact arms, i.e., the gripper is arranged on a median so as to be securely centered between the contact arms. The contact arms extend from the holder in such a manner that they may be brought successively into contact with the outer circumference of the bobbin to be engaged. The holder is additionally provided with sensors which are responsive to a preselected degree of pivotal movement of each contact arm, i.e., both sensors will be activated when the angle between the contact arms equals a predetermined angle which is determined by the bobbins being transferred.

BRIEF DESCRIPTION OF THE DRAWINGS

The present invention may be better understood and its numerous objects and advantages will become apparent to those skilled in the art by reference to the accompanying drawings wherein like reference numerals refer to like elements in the two figures and in which.

DESCRIPTION OF THE DISCLOSED EMBODIMENT

Figure 1:
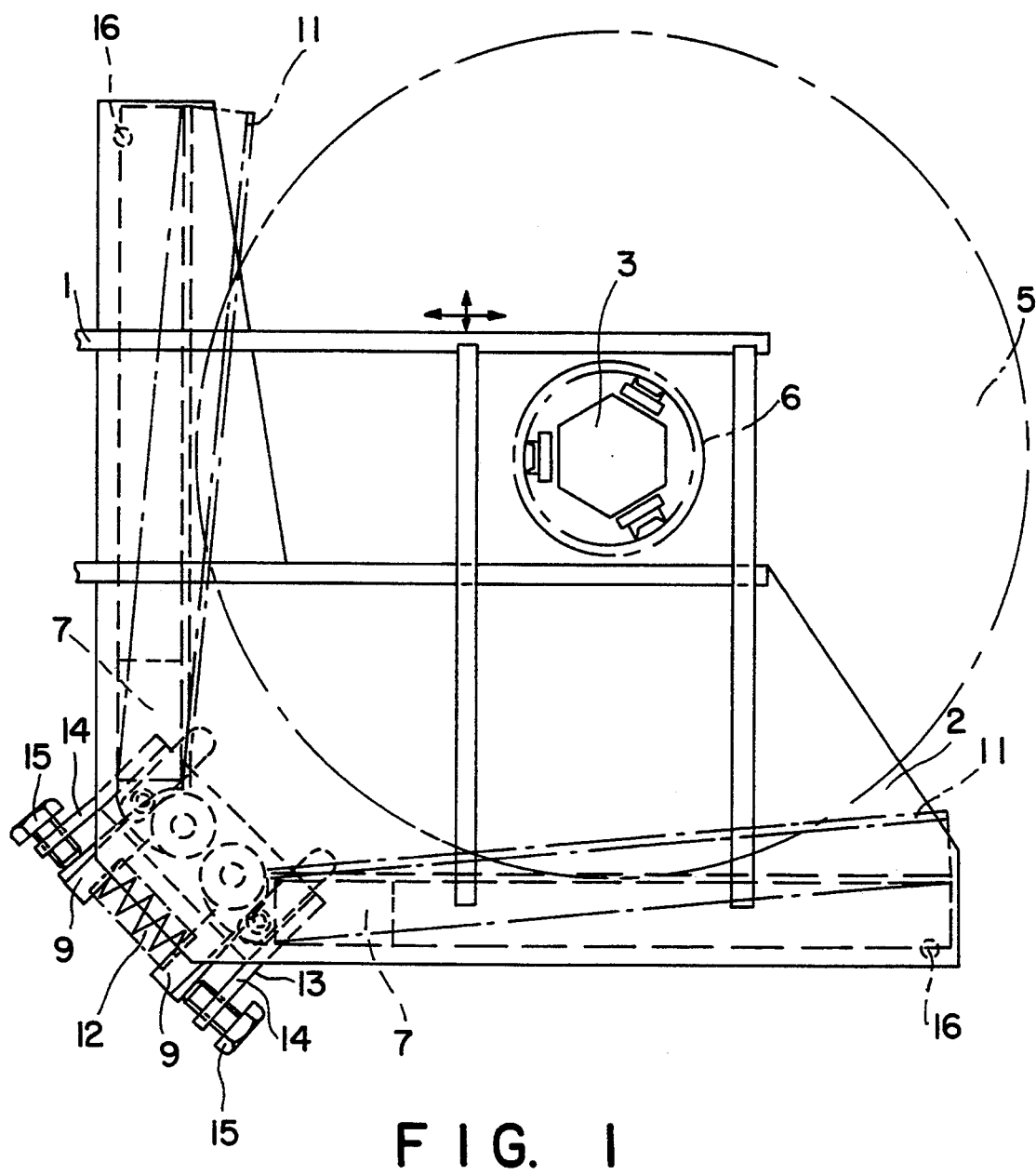
FIG. 1 is a schematic top plan view of apparatus in accordance with the present invention.
Figure 2:
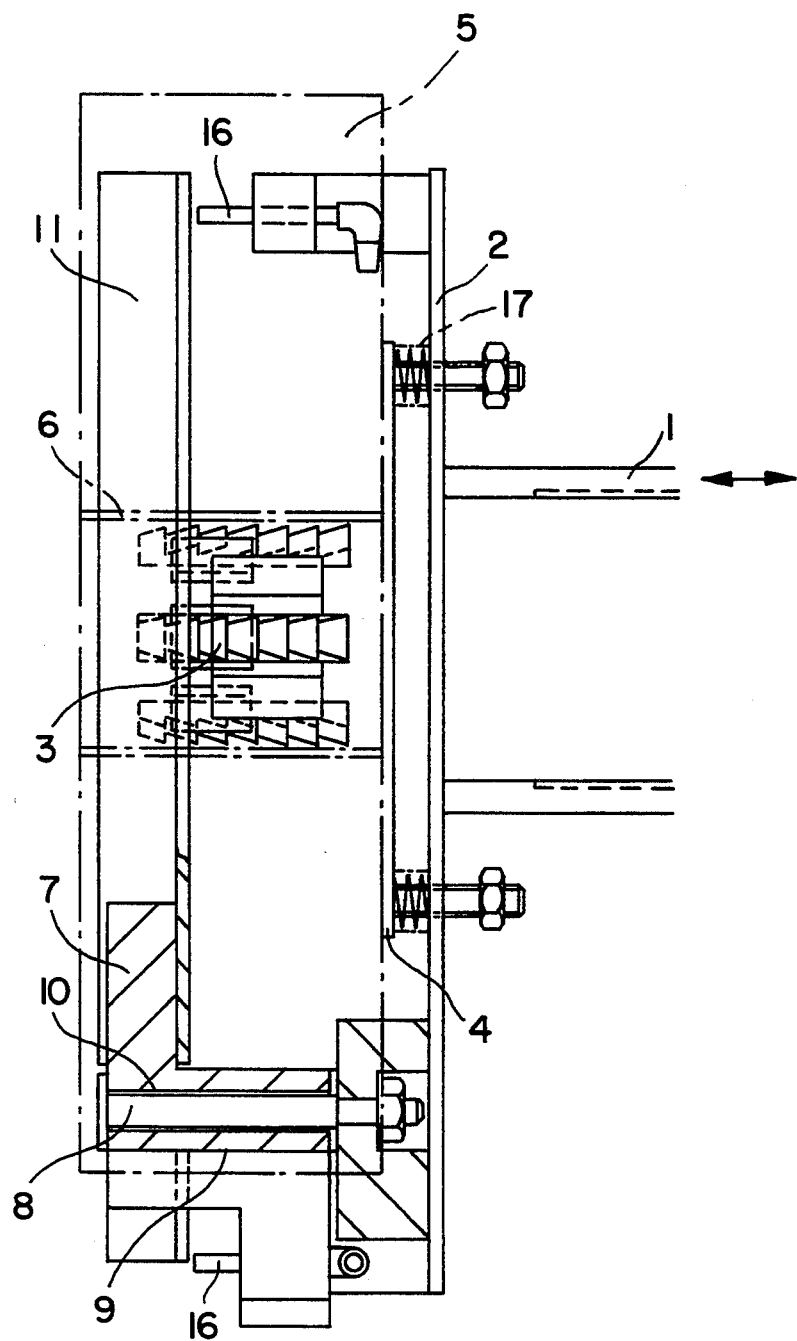
FIG. 2 is a side elevation view, partly in section, of the apparatus of FIG. 1.

With reference to the drawings, the disclosed embodiment of the present invention has been designed for association with a cigarette packaging machine such as, for example, the apparatus depicted in published German Patent Application No. 4,041,865. Such a packaging machine is provided with a movable transport arm such as indicated at 1 in FIGS. 1 and 2 of the instant application. The present invention includes a holder 2, substantially in the form of an angled plate, which is affixed to the free end of the transport arm 1. A gripping device 3 is resiliently supported from holder 2 via springs 17 and a support plate 4. In the disclosed embodiment the gripping mechanism 3 is a triple-jaw device which, when energized, will engage the inner diameter of the core tube of a bobbin thereby allowing the bobbin to be lifted and moved. In the drawings, a full bobbin, i.e., a bobbin tube 6 with a web-type packaging material wound thereon, has been indicated at 5. The bobbin 5 will be one of a plurality of substantially identical bobbins which are arranged in layers, adjacently and one above the other, on a pallet.

The object of the present invention is to axially align the gripping mechanism 3 with the core tube 6 of the bobbin and then cause the jaws of the gripping mechanism to be inserted into the tube. After insertion, the gripping mechanism will be energized to clamp the tube such that the thus gripped bobbin 5 can be transported from the pallet to a consumption station of a cigarette packaging machine. At the consumption station, the bobbin is transferred to a spool and the accessible free end of the packaging material is threaded into an appropriate conveying path.

A pair of levers 7, which function as feeler guages or contact arms, are attached to holder 2 in an apex region of the angled plate which defines the holder. The levers 7 are rotatable about a pair of adjacent axes which are defined by bolts 8 fastened to holder 2. The axes of the bolts 8 are parallel to one another and also parallel to the axis of the gripping mechanism 3. The axis of the gripping mechanism 3 is located so as to be equidistant from the axes of the bolts 8. Because of the manner in which the levers 7 interact, as will be described below, the axis of the gripping mechanism 3 is centered between the levers 7, i.e., the axis of gripping mechanism 3 lies on the median which bisects the angle between levers 7.

The levers 7 are double lever-type devices and thus each have an end portion 9. Each lever includes a bushing 10 which is mounted on a bolt 8 and extends through the lever end portion 9. The levers 7 further each include a contact strip 11 which extends from the end portion 9, is angled in section and is spaced away from the holder 2. The length of the contact strips 11 is selected such that the levers 7 extend substantially over the diameter of the full bobbin 5 to be transported. Through the use of a common compression spring 12, the levers 7 are resiliently biased inwardly, i.e., in the direction of the gripping mechanism 3.

The angle enclosed by the levers 7 when in their normal or undeflected portions can be varied by means of adjusting devices 13. Each adjusting device 13 comprises an arm 14 which is fixed to the holder 2 and an adjusting screw 15 which engages the lever 7.

A pair of sensors 16, which may be photoelectric devices, are mounted on holder 2. In the disclosed embodiment the sensors 16 are located respectively in planes which are perpendicular to one another. The sensors respond to the contact strips 11 of the levers 7 and thus will provide an output signal when the corresponding lever 7 assumes an angle of 45° with respect to the median.

In the operation of the present invention, the transport arm 1 will initially be displaced linearly in a plane parallel to the axial planes of the bobbins 5 at the supply location until a contact strip 11 comes into engagement with the bobbin to be transferred. The contact strip 11 projects from the holder 2 relative to the gripping mechanism 3 such that, during this initial linear motion, the gripping mechanism will not contact the outer circumference of the full bobbin and thus will not impede the finding operation. When the first of the strips 11 to make contact with the bobbin has been deflected to the point where the associated sensor 16 is actuated, movement of the transport arm 1 in the initial direction is stopped and a second linear motion in initiated in a direction perpendicular to the first direction of motion and in the same plane. This second linear motion will inevitably cause the second contact strip 11 to come into engagement with the outer circumference of a full bobbin 5. When the second sensor 16 is actuated, indicative of the fact that both of the levers 7 are at an angle of 45° with respect to the median, movement in the second direction is terminated. The first and second directions are shown by the arrows in FIG. 1. The gripping mechanism 3 will now be substantially coaxial with the bobbin core 6 and thus the transport arm 1 will be caused to move in a third direction, perpendicular to the plane defined by the first and second directions of movement, and the jaws gripping mechanism 3 will be inserted into the bobbin core tube. This motion in the third direction will be terminated when the plate 4 contacts the upper side of the bobbin. The gripping mechanism will then be actuated so as to clamp the bobbin core and the bobbin can thereafter be raised and transported. The third direction is shown by the arrow in FIG. 2.

The present invention allows bobbins 5 to be serially picked up from a pallet without complicated control being exercised over the movement of the transport arm 1 and without the need of other complex control devices. Thus, the present invention achieves the automatic centering of the gripping mechanism relative to the core tube 6 of the bobbin in an efficient and uncomplicated manner.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In an apparatus for retrieving bobbins containing packaging material in the form of a web from storage for the purpose of conveying the bobbins individually to a work station where the packaging material will be withdrawn from a retrieved bobbin for consumption, the retrieving apparatus including gripping means for internally engaging a tubular wall of a bobbin core, the gripping means defining an axis, a generally axial alignment of the gripping means and the bobbin core permitting insertion of the gripping means into the bobbin core, the retrieving apparatus also including drive means for generating the movements which are transmitted to the gripping means in order to establish said axial alignment, the improvement comprising:

holder means supporting said gripping means, said holder means being coupled to the drive means whereby the position of said holder means may be adjusted in three mutually orthogonal directions;

a pair of contact arms supported from said holder means for pivotal motion, said arms being angularly related and having a normal undeflected position, the axis of said gripping means being located substantially equidistant from each of said arms when said arms are in said normal undeflected position, said arms being independently movable in response to contact thereof with the packaging material on a bobbin;

means for resiliently biasing said contact arms toward said normal undeflected position; and sensor means mounted on said holder means for cooperation with each of said contact arms, said sensor means being normally out of alignment with said arms, the pivoting of each said arm to a preselected angular position in response to contact with the packaging material on a bobbin causing alignment to be established between said pivoted arm and its cooperating sensor means whereby the sensor means will provide a control signal for said drive means indicating that movement of said holder means in one of said three directions should be terminated, the provision of signals by both of said sensor means indicating a generally coaxial relationship between said gripping means and the bobbin core whereupon said holder means may be caused to move to insert the gripping means into the bobbin core.

2. The apparatus of claim 1 wherein said holder means includes a transport arm which is movable in said three directions, said transport arm being connected to said drive means.

3. The apparatus of claim 1 wherein each of said contact arms has a free end which contacts the packaging material on a bobbin and at least portions of said free ends of said contact arms are generally disposed in a common plane, said common plane being oriented transversely with respect to the axis of said gripping means.

4. The apparatus of claim 1 wherein said contact arms comprise levers, said levers each including a bobbin contact strip.

5. The apparatus of claim 1 wherein said contact arms are pivotal about parallel axes, said parallel axes being located adjacent to one another and being parallel to the axis of said gripping means.

6. The apparatus of claim 4 wherein said resiliently biasing means comprises a common compression spring.

7. The apparatus of claim 1 further comprising:
means for adjusting the normal undeflected angular position of each of said arms relative to said gripping means axis.

8. The apparatus of claim 1 wherein said holder means comprises:
a holder plate;
a support plate supporting said gripping means; and
means for resiliently supporting said support plate from said holder plate.

9. The apparatus of claim 5 wherein said contact arms comprise levers, said levers each including a bobbin contact strip.

10. The apparatus of claim 9 wherein said resiliently biasing means comprises a common compression spring.

11. The apparatus of claim 4 further comprising:
means for adjusting the normal undeflected angular position of each of said arms relative to said gripping means axis.

12. The apparatus of claim 9 further comprising:
means for adjusting the normal undeflected angular position of each of said arms relative to said gripping means axis.

13. The apparatus of claim 12 wherein said resiliently biasing means comprises a common compression spring.

14. The apparatus of claim 13 wherein said holder means comprises:
a holder plate;
a support plate supporting said gripping means; and
means for resiliently supporting said support plate from said holder plate.

15. The apparatus of claim 14 wherein each of said contact arms has a free end which contacts the packaging material on a bobbin and at least portions of said free ends of said contact arms are generally disposed in a common plane, said common plane being oriented transversely with respect to the axis of said gripping means.

16. The apparatus of claim 15 wherein said holder means includes a transport arm which is movable in said three directions, said transport arm being connected to said drive means.

17. The apparatus of claim 11 wherein each of said contact arms has a free end which contacts the packaging material on a bobbin and at least portions of said free ends of said contact arms are generally disposed in a common plane, said common plane being oriented transversely with respect to the axis of said gripping means.

18. The apparatus of claim 11 wherein said holder means comprises:
a holder plate;
a support plate supporting said gripping means; and
means for resiliently supporting said support plate from said holder plate.

19. The apparatus of claim 17 wherein said holder means comprises:
a holder plate;
a support plate supporting said gripping means; and
means for resiliently supporting said support plate from said holder plate.

* * * * *